United States Patent
Suzuki

(10) Patent No.: US 10,906,457 B2
(45) Date of Patent: Feb. 2, 2021

(54) LIGHTING DEVICE

(71) Applicant: TS TECH CO., LTD., Saitama (JP)

(72) Inventor: Masanori Suzuki, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 117 days.

(21) Appl. No.: 16/075,364

(22) PCT Filed: Jan. 31, 2017

(86) PCT No.: PCT/JP2017/003468
§ 371 (c)(1),
(2) Date: Aug. 3, 2018

(87) PCT Pub. No.: WO2017/135262
PCT Pub. Date: Aug. 10, 2017

(65) Prior Publication Data
US 2019/0061615 A1   Feb. 28, 2019

(30) Foreign Application Priority Data

Feb. 4, 2016  (JP) ................................ 2016-020131
Feb. 4, 2016  (JP) ................................ 2016-020132

(51) Int. Cl.
*G02B 6/42*     (2006.01)
*B60Q 3/217*    (2017.01)
(Continued)

(52) U.S. Cl.
CPC ............. *B60Q 3/217* (2017.02); *B60Q 3/51* (2017.02); *B60Q 3/54* (2017.02); *B60Q 3/62* (2017.02);
(Continued)

(58) Field of Classification Search
None
See application file for complete search history.

(56) References Cited

U.S. PATENT DOCUMENTS

| 4,897,711 A * | 1/1990 | Blonder ............... G02B 6/4277 |
| | | 257/48 |
| 2002/0048436 A1* | 4/2002 | Nishikawa ........... G02B 6/4224 |
| | | 385/88 |

(Continued)

FOREIGN PATENT DOCUMENTS

| JP | S59-30113 U | 2/1984 |
| JP | S60-144190 U | 9/1985 |

(Continued)

OTHER PUBLICATIONS

Extended European Search Report (EESR) dated Jan. 7, 2019 for the corresponding European patent application No. 17747418.6.

(Continued)

*Primary Examiner* — Chad H Smith
(74) *Attorney, Agent, or Firm* — Michael Best & Friedrich LLP

(57) ABSTRACT

A light guide body is held in a more compact holder. In a lighting device (10A) including a light emitter (20), an optical fiber (30), and a holder (40) configured to hold the optical fiber (30) with the optical fiber (30) facing the light emitter (20), the holder (40) includes two sandwiching portions (44, 45) configured to engage with each other in a state in which a holding target portion (31) of the optical fiber (30) held by the holder (40) is sandwiched in a first direction crossing an extending direction of the holding target portion (31). Two sandwiching portions (44, 45) engage with each other at positions adjacent to the holding target portion (31) in a second direction crossing both of the extending direction and the first direction.

20 Claims, 8 Drawing Sheets

(51) Int. Cl.
*F21V 17/00* (2006.01)
*B60Q 3/54* (2017.01)
*B60Q 3/51* (2017.01)
*B60Q 3/62* (2017.01)
*F21V 8/00* (2006.01)

(52) U.S. Cl.
CPC ............ *F21V 17/00* (2013.01); *G02B 6/0006* (2013.01); *G02B 6/42* (2013.01)

(56) References Cited

U.S. PATENT DOCUMENTS

| | | |
|---|---|---|
| 2003/0123836 A1 | 7/2003 | Fujisawa et al. |
| 2011/0026896 A1 | 2/2011 | Winberg et al. |
| 2011/0150409 A1 | 6/2011 | Childers et al. |
| 2011/0199781 A1 | 8/2011 | Okuno et al. |
| 2014/0198519 A1 | 7/2014 | Okuno et al. |

FOREIGN PATENT DOCUMENTS

| | | |
|---|---|---|
| JP | H4-85309 U | 7/1992 |
| JP | H08-185908 A | 7/1996 |
| JP | H10-206282 A | 8/1998 |
| JP | H11-111361 A | 4/1999 |
| JP | 2001-056422 A | 2/2001 |
| JP | 2001-156377 A | 6/2001 |
| JP | 2003-181853 A | 7/2003 |
| JP | 2007-178884 A | 7/2007 |
| JP | 2008-143425 A | 6/2008 |
| JP | 2008-242225 A | 10/2008 |
| JP | 2011-121503 A | 6/2011 |
| JP | 2013-54383 A | 3/2013 |
| RU | 2337732 C1 | 11/2008 |
| WO | 2009/035776 A1 | 3/2009 |

OTHER PUBLICATIONS

Japanese Office Action dated Oct. 1, 2019 for the corresponding Japanese Patent Application No. 2016-020131, with machine English translation.

International Search Report dated Apr. 11, 2017 for corresponding PCT Application No. PCT/JP2017/003468.

Japanese Office Action dated May 12, 2020 for the corresponding Japanese Patent Application No. 2016-020131, with English machine translation.

* cited by examiner

LIGHTING DEVICE

CROSS-REFERENCE TO RELATED APPLICATIONS

This application is entering into national phase of PCT Application Number PCT/JP2017/003468, filed on Jan. 31, 2017. Further, this application claims the benefit of priority from Japanese Application Number 2016-020131, filed on Feb. 4, 2016, and Japanese Application Number 2016-020132, filed on Feb. 4, 2016, the entire contents of which are incorporated herein by reference.

TECHNICAL FIELD

The present invention relates to a lighting device, and particularly relates to a lighting device configured such that a light guide body configured to transmit light from a light emitter is held by a holder.

BACKGROUND ART

A lighting device used in a conveyance is sometimes used for the purpose of enhancing vehicle interior decorativeness with the lighting device being attached to, e.g., a door lining or a center console. Examples of such a lighting device include a lighting device described in Patent Literature 1. The lighting device described in Patent Literature 1 is a vehicle lighting device, and has a light source, a light guide body (specifically, light guide rod) configured to transmit light from the light source, and a lighting device body (hereinafter merely referred to as a "device body") attached to a predetermined position while holding these components.

CITATION LIST

Patent Literature

PATENT LITERATURE 1: JP 2011-121503 A

SUMMARY OF INVENTION

Technical Problem

In the lighting device described in Patent Literature 1, the light guide body is sandwiched between a cover member assembled with the device body and the device body, and in this manner, the light guide body is attached to the device body. More specifically, the cover member and the device body sandwiching an end portion of the light guide body, which extends elongated along a predetermined direction, in an extending direction thereof engage with each other at a position outside of the end portion of the light guide body in the extending direction thereof. For this reason, in the lighting device described in Patent Literature 1, the length of the cover member in the extending direction of the light guide body is relatively long, and the size of the lighting device including the cover member is increased by such a length.

Moreover, in the lighting device described in Patent Literature 1, an engagement claw is formed at the cover member, and is engageable with an engagement target claw provided at the device body. The light guide body is attached to the device body in such a manner that the engagement claw engages with the engagement target claw with the light guide body being sandwiched between the cover member and the device body. In this configuration, when the engagement claw engages with the engagement target claw, a proper portion of the engagement claw needs to be engaged with the engagement target claw.

However, there is a probability that a portion of the engagement claw to be engaged with the engagement target claw shifts from the proper portion due to, e.g., accidental movement of the cover member. When the engagement claw engages, as described above, with the engagement target claw with the engagement claw being shifted from an intended engagement portion, an engagement state between the engagement claw and the engagement target claw is not stable. As a result, there is a probability that the light guide body cannot be properly attached to the device body.

The present invention has been made in view of the above-described problems, and an object of the present invention is to provide a lighting device capable of holding a light guide body by a more compact structure.

Moreover, another object of the present invention is to provide a lighting device capable of properly sandwiching and holding a light guide body in the structure of holding the light guide body with the light guide body being sandwiched by a holder.

Solution to Problem

According to the lighting device of the present invention, the above-described problems are solved by a lighting device including a light emitter, a linearly-extending light guide body, and a holder configured to hold the light guide body with the light guide body facing the light emitter. The holder includes two sandwiching portions configured to engage with each other in a state in which a holding target portion of the light guide body held by the holder is sandwiched in a first direction crossing an extending direction of the holding target portion. Two sandwiching portions engage with each other at positions adjacent to the holding target portion in a second direction crossing both of the extending direction and the first direction.

In the lighting device of the present invention configured as described above, two sandwiching portions provided at the holder engage with each other in a state in which two sandwiching portions sandwich the holding target portion in the first direction crossing the extending direction of the holding target portion of the light guide body. With this configuration, the holder holds the light guide body. Note that two sandwiching portions engage with each other at the positions adjacent to the holding target portion in the second direction crossing both of the extending direction of the holding target portion and the first direction. With the configuration of engaging two sandwiching portions at the side of the light guide body as described above, each sandwiching portion can be more compact. As a result, the holder has a more compact structure.

Moreover, in the above-described lighting device, one of two sandwiching portions is preferably coupled to the other one of two sandwiching portions with a hinge, and is preferably freely rotatable relative to the other one of two sandwiching portions.

In the above-described configuration, two sandwiching portions are coupled together by the hinge, and therefore, handling of the sandwiching portions (specifically, engagement between the sandwiching portions) is more facilitated as compared to the configuration of separating the sandwiching portions from each other.

Further, in the above-described lighting device, a rotary shaft when one of two sandwiching portions rotates relative to the other one of two sandwiching portions may be along the extending direction.

In the above-described configuration, the rotary shaft when one sandwiching portion rotates is along the extending direction of the holding target portion of the light guide body. With such a configuration, two sandwiching portions can be more easily engaged with each other at the side of the light guide body.

In addition, in the above-described lighting device, the holder preferably includes a fixing portion formed for fixing the holder to a fixing position, and the fixing portion is preferably provided on a side opposite to the position of the rotary shaft in the second direction.

In the above-described configuration, the fixing portion of the holder is provided at the opposite position of the rotary shaft when one sandwiching portion rotates. With such a configuration, contact of the rotary shaft with the fixing portion can be reduced.

Moreover, in the above-described lighting device, the holder preferably includes a holder body to be assembled with the light emitter, and the holder body and two sandwiching portions are preferably integrated together.

In the above-described configuration, the holder body and two sandwiching portions are integrated together, and therefore, the number of components is more reduced as compared to the configuration of separating the holder body and two sandwiching portions from each other.

Further, in the above-described lighting device, in a state in which the holder holds the light guide body, the outer periphery of the holding target portion is preferably surrounded by two sandwiching portions.

In the above-described configuration, the outer periphery of the holding target portion of the light guide body is surrounded by two sandwiching portions, and therefore, the state of holding the holding target portion can be stabilized. Moreover, since the outer periphery of the holding target portion is surrounded by two sandwiching portions, light leakage from the holding target portion can be reduced. As a result, light transmission in the light guide body can be efficiently performed.

In addition, in the above-described lighting device, the holder preferably includes the holder body to be assembled with the light emitter, the light emitter preferably includes a light source and a light collecting lens configured to collect light emitted from the light source, the holder body preferably includes a wall provided with an opening, and two sandwiching portions preferably engage with each other in a state in which two sandwiching portions sandwich the holding target portion such that an end surface of the holding target portion faces the light collecting lens through the opening.

In the above-described configuration, when the holding target portion is sandwiched between two sandwiching portions, the end surface of the holding target portion faces the light collecting lens through the opening. With such a configuration, the light guide body can be held at the holder in a state in which the light emitted from the light collecting lens can be favorably trapped.

Moreover, in the above-described lighting device, one of two sandwiching portions may have a claw-shaped engagement portion to be engaged with an engagement target portion of the other one of two sandwiching portions, the other one of two sandwiching portions may have the engagement target portion and a position determination portion configured to determine the position of the holding target portion at a position at which the end surface contacts the wall, and the engagement target portion may be provided on an outer peripheral surface of the position determination portion.

In the above-described configuration, after the position of the holding target portion has been determined such that the end surface of the holding target portion contacts the holder wall (the wall provided with the opening), the sandwiching portions are engaged with each other with the holding target portion being sandwiched between two sandwiching portions. That is, in the above-described configuration, the sandwiching portions can be engaged with each other after the position of the holding target portion has been properly determined.

Further, in the above-described lighting device, one of two sandwiching portions preferably has a raised portion formed on a surface facing the holding target portion. In a state in which two sandwiching portions sandwich the holding target portion, the raised portion preferably contacts and presses the holding target portion.

In the above-described configuration, when two sandwiching portions sandwich the holding target portion of the light guide body, the raised portion provided at one sandwiching portion contacts and presses the holding target portion. This can reduce detachment of the holding target portion sandwiched between two sandwiching portions.

In addition, in the above-described lighting device, one of two sandwiching portions preferably has the claw-shaped engagement portion to be engaged with the engagement target portion of the other one of two sandwiching portions. At an end portion of the engagement portion in the extending direction, a locking portion configured to contact and lock the engagement target portion with the engagement portion engaging with the engagement target portion is preferably provided.

In the above-described configuration, when the engagement portion provided at one sandwiching portion engages with the engagement target portion provided at the other sandwiching portion, the engagement target portion is locked by the locking portion formed at the end portion of the engagement portion. With this configuration, shift of an engagement position between the engagement portion and the target engagement portion in the extending direction of the holding target portion of the light guide body can be reduced.

Moreover, in the above-described lighting device, the holder preferably includes the holder body to be assembled with the light emitter, two sandwiching portions, and a reducer provided at a position next to two sandwiching portions in the extending direction and configured to reduce shift of an engagement portion between two sandwiching portions toward the position of the holder body in the extending direction.

In the lighting device configured as described above, the reducer is provided at the holder body, and can reduce shift of the engagement portion between two sandwiching portions toward the position of the holder body in the extending direction of the holding target portion of the light guide body. With this configuration, two sandwiching portions engage with each other at a proper engagement portion, and as a result, the light guide body is properly held by the holder.

Further, in the above-described lighting device, the reducer is preferably a protruding portion protruding from the holder body toward two sandwiching portions in the extending direction.

In the above-described configuration, the protruding portion protruding from the holder body forms the reducer, and therefore, the reducer can be provided at the holder body in a simpler configuration.

In addition, in the above-described lighting device, one of two sandwiching portions preferably has the raised portion formed on the surface facing the holding target portion. In a state in which two sandwiching portions sandwich the holding target portion, the raised portion preferably contacts the holding target portion.

In the above-described configuration, when two sandwiching portions sandwich the holding target portion of the light guide body, the raised portion provided at one sandwiching portion contacts and presses the holding target portion. This can reduce detachment of the holding target portion sandwiched between two sandwiching portions.

Moreover, in the above-described lighting device, the raised portion may be a wedge-shaped protrusion, and may have an inclined surface closer to the surface facing the holding target portion with a distance from the holder body in the extending direction.

In the above-described configuration, the raised portion configured to press the holding target portion includes the wedge-shaped protrusion, and the protrusion has the inclined surface lower with a distance from the holder body. This can more effectively reduce detachment of the holding target portion sandwiched between two sandwiching portions.

Further, in the above-described lighting device, a top portion of the raised portion may be cut out in an arc shape.

In the above-described configuration, the top portion of the raised portion is cut out in the arc shape, and therefore, damage of the holding target portion of the light guide body due to pressing of the holding target portion by the raised portion can be reduced.

Note that in the above-described lighting device, one of two sandwiching portions may have the claw-shaped engagement portion to be engaged with the engagement target portion of the other one of two sandwiching portions, and an adjacent portion adjacent to an end portion of the engagement portion closer to the holder body in the extending direction. The adjacent portion may be in a shape unable to engage with the engagement target portion.

In the above-described configuration, the adjacent portion of one sandwiching portion adjacent to the engagement portion is unable to engage with the engagement target portion provided at the other sandwiching portion. With this configuration, shift of the engagement portion between two sandwiching portions in the extending direction of the holding target portion of the light guide body can be more effectively reduced.

Note that in the above-described lighting device, in a state in which two sandwiching portions engage with each other, a clearance is preferably formed between one of two sandwiching portions and the holder body, and part of the holding target portion is preferably exposed through the clearance.

In the above-described configuration, in a state in which two sandwiching portions engage with each other, the clearance is formed between one sandwiching portion and the holder body. Moreover, part of the holding target portion is exposed through such a clearance. With this configuration, e.g., the position of the holding target portion can be checked through the above-described clearance.

Note that in the above-described lighting device, the light emitter may include the light source and the light collecting lens configured to collect the light emitted from the light source, the holder body may include the wall provided with the opening, and two sandwiching portions may engage with each other in a state in which two sandwiching portions sandwich the holding target portion such that the end surface of the holding target portion faces the light collecting lens through the opening.

In the above-described configuration, when the holding target portion is sandwiched between two sandwiching portions, the end surface of the holding target portion faces the light collecting lens through the opening. With such a configuration, the light guide body can be held at the holder so that the light emitted from the light collecting lens can be favorably trapped.

Note that in the above-described lighting device, the light guide body may be an optical fiber, and the size of an end of the opening closer to the holding target portion may be smaller than the sectional size of the optical fiber.

In the above-described configuration, the size of the end of the opening closer to the holding target portion is smaller than the sectional size of the optical fiber forming the light guide body. Thus, the light emitted from the light collecting lens more properly directs to the optical fiber (in a precise sense, the end surface of the holding target portion). As a result, light transmission in the optical fiber is efficiently performed.

Note that in the above-described lighting device, one of two sandwiching portions is preferably coupled to the other one of two sandwiching portions with the hinge and is preferably freely rotatable relative to the other one of two sandwiching portions, and two sandwiching portions preferably engage with each other at a position on a near side of the reducer in the extending direction.

In the above-described configuration, two sandwiching portions are coupled together with the hinge, and therefore, handling of the sandwiching portions (specifically, engagement between the sandwiching portions) is more facilitated as compared to the configuration of separating the sandwiching portions from each other. Moreover, two sandwiching portions engage with each other at the position on the near side of the reducer in the extending direction of the holding target portion of the light guide body, and therefore, the function of the reducer against position shift of the engagement portion is properly fulfilled.

Advantageous Effects of Invention

According to the present invention, two sandwiching portions engage with each other at the side of the light guide body. Thus, each sandwiching portion can be more compact, and the holder can have a more compact structure.

Moreover, according to the present invention, two sandwiching portions are coupled together with the hinge, and therefore, handling of the sandwiching portions (specifically, engagement between the sandwiching portions) is facilitated.

Further, according to the present invention, the rotary shaft when one sandwiching portion rotates is along the extending direction of the holding target portion of the light guide body, and therefore, two sandwiching portions can be more easily engaged with each other at the side of the light guide body.

In addition, according to the present invention, the fixing portion of the holder is provided at the opposite position of the rotary shaft when one sandwiching portion rotates, and therefore, contact of the rotary shaft with the fixing portion can be reduced.

Moreover, according to the present invention, the holder body and two sandwiching portions are integrated together, and therefore, the number of components is more reduced as compared to the configuration of separating the holder body and two sandwiching portions from each other.

Further, according to the present invention, the outer periphery of the holding target portion of the light guide body is surrounded by two sandwiching portions. Thus, the state of holding the holding target portion can be stabilized, and light leakage from the holding target portion can be reduced.

In addition, according to the present invention, the holding target portion sandwiched between two sandwiching portions faces the light collecting lens through the opening. With such a configuration, the light guide body can be held at the holder in a state in which the light emitted from the light collecting lens can be favorably trapped.

Moreover, according to the present invention, after the position of the holding target portion has been determined such that the end surface of the holding target portion contacts the holder wall (the wall provided with the opening), the sandwiching portions can be engaged with each other with the holding target portion being sandwiched between two sandwiching portions.

Further, according to the present invention, the raised portion provided at one sandwiching portion contacts and presses the holding target portion of the light guide body. This can reduce detachment of the holding target portion sandwiched between two sandwiching portions.

In addition, according to the present invention, shift of the engagement position between the sandwiching portions can be properly reduced by the locking portion.

Moreover, according to the present invention, position shift of the engagement portion between two sandwiching portions is reduced, and therefore, the light guide body is properly held by the holder.

Further, according to the present invention, the reducer can be provided at the holder body in a simple configuration.

In addition, according to the present invention, the raised portion provided at one sandwiching portion contacts and presses the holding target portion. This can reduce detachment of the holding target portion sandwiched between two sandwiching portions.

Moreover, according to the present invention, the raised portion including the wedge-shaped protrusion has the inclined surface lower with a distance from the holder body. This can more effectively reduce detachment of the holding target portion sandwiched between two sandwiching portions.

Further, according to the present invention, the top portion of the raised portion is cut out in the arc shape, and therefore, damage of the holding target portion of the light guide body due to pressing of the holding target portion by the raised portion can be reduced.

DESCRIPTION OF EMBODIMENTS

Hereinafter, one embodiment (the present embodiment) of the present invention will be, as necessary, described with reference to the drawings. Note that the embodiment described below is for the sake of easy understanding of the present invention, and is not intended to limit the present invention. That is, changes and modifications can be made to the present invention without departing from the gist of the present invention, and needless to say, the present invention includes equivalents thereof.

Moreover, in description below, three directions perpendicular to each other will be referred to as an "X-direction," a "Y-direction," and a "Z-direction." The "Y-direction" described herein corresponds to an "extending direction of a holding target portion of a light guide body" in the present invention. Moreover, the "Z-direction" corresponds to a "direction crossing the extending direction of the holding target portion of the light guide body," i.e., a "first direction" in the present invention. Further, the "X-direction" corresponds to a "direction crossing both of the extending direction of the holding target portion of the light guide body and the first direction," and, i.e., a "second direction" in the present invention. Note that each of FIGS. 2 to 15 illustrates a corresponding one (a direction which can be illustrated in each figure) of these three directions.

<<Outline of Lighting Device According to Present Embodiment>>

First, an outline of a lighting device according to the present embodiment will be described. Note that a lighting device utilized as an interior component (a decorative component) for a vehicle will be hereinafter described as an example of the lighting device according to the present embodiment. Note that the lighting device of the present invention is not limited to utilization as the interior component for the vehicle, and may be utilized as an exterior component for the vehicle or utilized for other conveyances than the vehicle.

Figure 1:
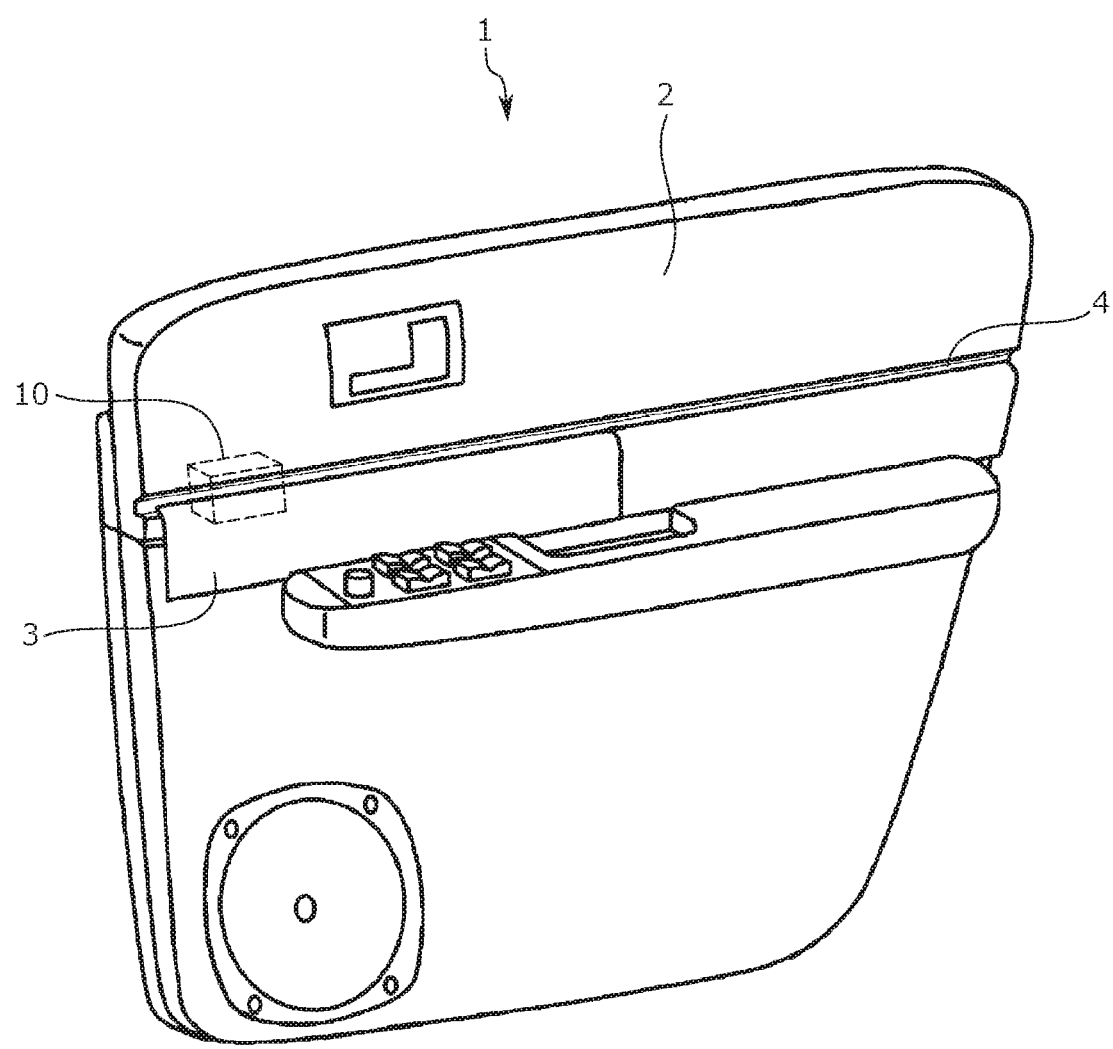
FIG. 1 is a view of a utilization example of a lighting device of the present invention.

The lighting device (hereinafter referred to as a "subject device 10") according to the present embodiment is, as illustrated in FIG. 1, used as a component forming a vehicle door lining 1. More specifically, the subject device 10, abase trim 2, and a panel trim 3 together form the vehicle door lining 1. Moreover, the subject device 10 is arranged on a back side of the base trim 2 at the vehicle door lining 1. Much more specifically, the subject device 10 is, with a fastener such as a bolt, fixed to an inner panel (not shown) of a door on the back side of the base trim 2.

The subject device 10 includes a light source and an optical fiber as the light guide body. The optical fiber is configured to receive light emitted from the light source, thereby transmitting the light along a fiber routing direction (the direction of routing the optical fiber). Moreover, the optical fiber is routed along a housing groove 4 formed at a surface of the base trim 2 with the optical fiber being housed in the housing groove 4.

As illustrated in FIG. 1, an upper end portion of the panel trim 3 is at a position of the vehicle door lining 1 facing the housing groove 4. A certain gap (clearance) is provided between a portion of the base trim 2 provided with the housing groove 4 and the upper end portion of the panel trim 3. The light from each portion of the optical fiber is emitted toward the inside of a vehicle compartment through the above-described gap.

As described above, the subject device 10 distributes, through the gap formed between the base trim 2 and the panel trim 3, the light transmitted through the optical fiber. With this configuration, the light is emitted along the optical fiber routing direction (in other words, a direction in which the above-described gap is formed) at the vehicle door lining 1. With this configuration, the inside of the vehicle compartment is illuminated, and decorativeness (design) of the vehicle door lining 1 is improved.

<<Configuration Example of Lighting Device>>

Next, a configuration of a lighting device 10A according to a first embodiment will be described as a configuration example of the lighting device. The lighting device 10A descried herein is an example of the subject device 10, and corresponds to the lighting device of the present invention.

The lighting device 10A employs a configuration illustrated in FIGS. 2 to 5. Specifically, the lighting device 10A has a light emitter 20, an optical fiber 30 as a light guide body, and a holder 40, as illustrated in these figures. The light emitter 20 has a light source, and is assembled with the holder 40 (in a precise sense, a holder body 41). The optical fiber 30 is a linearly-extending member, and has a configuration similar to that of a typical optical fiber. That is, the optical fiber 30 includes a core and a clad, and the section of the optical fiber 30 is in a substantially circular shape.

The holder 40 is a component configured to hold the optical fiber 30 with the optical fiber 30 facing the light emitter 20. Moreover, the holder 40 is configured to hold a holding target portion 31 as a terminal end portion of the optical fiber 30.

Figure 2:
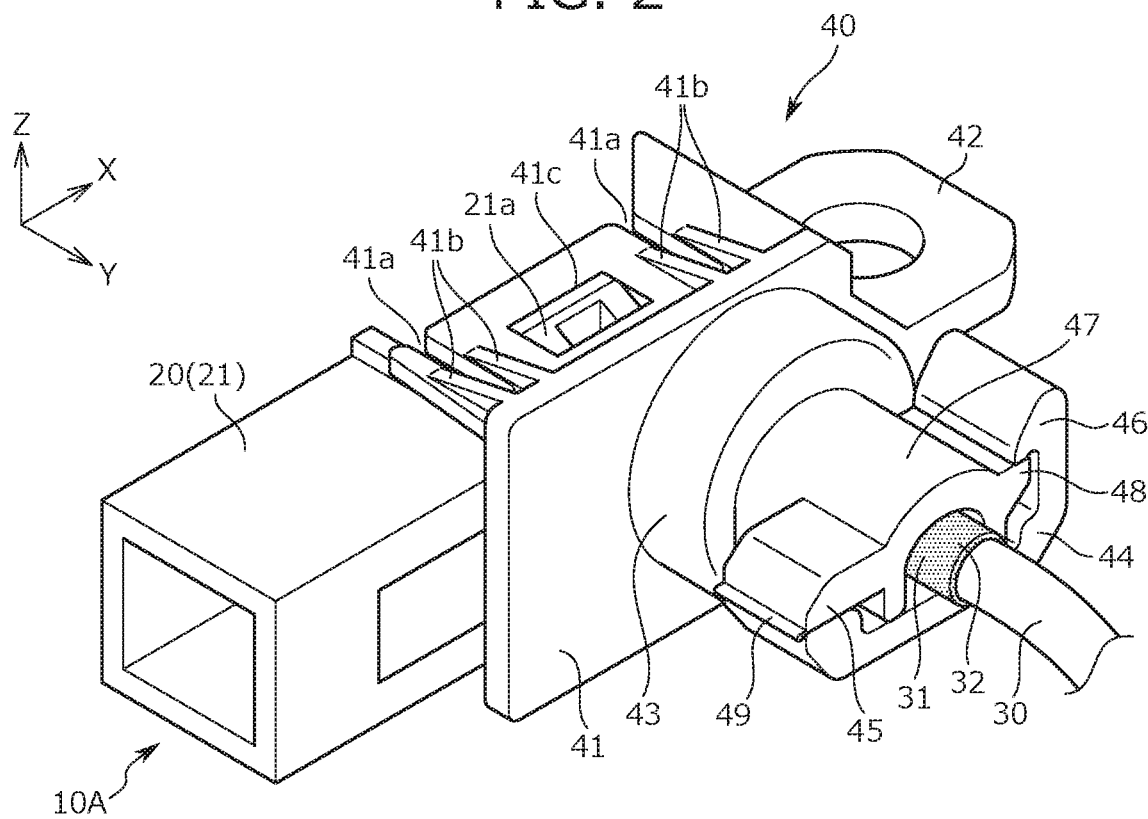
FIG. 2 is a perspective view of a lighting device diagonally from a lateral side.
Figure 5:
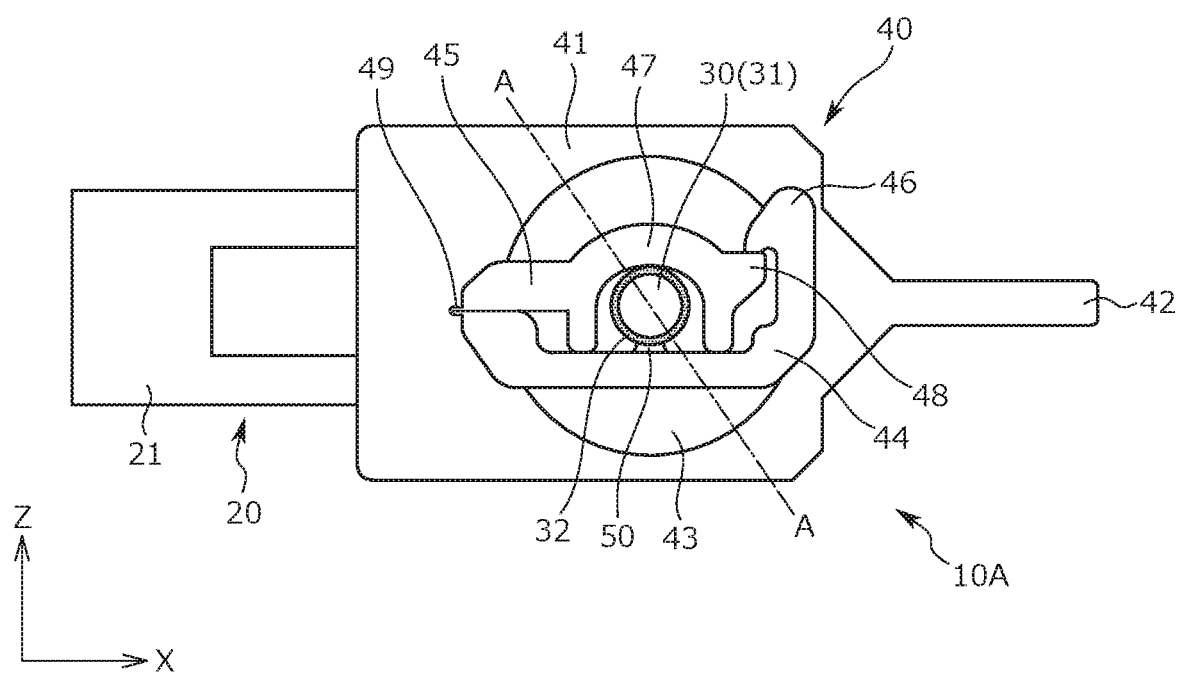
FIG. 5 is a view of the lighting device from the lateral side.

Note that a shrinkable band 32 is, as illustrated in FIGS. 2 and 5, fitted onto an outer peripheral portion of the terminal end portion of the optical fiber 30, i.e., the holding target portion 31. The shrinkable band 32 is a tubular rubber band configured to cover the outer peripheral portion of the terminal end portion of the optical fiber 30. The shrinkable band 32 is fitted onto the outer peripheral portion of the terminal end portion of the optical fiber 30, and accordingly, friction resistance between the holding target portion 31 and the holder 40 increases. As a result, the holding target portion 31 of the optical fiber 30 held at the holder 40 is less detachable from the holder 40. Moreover, the outer peripheral portion of the terminal end portion of the optical fiber 30 is covered with the shrinkable band 32, and therefore, light leakage at the terminal end portion is reduced.

Note that the holder 40 itself is fixed in such a manner that a fixing portion 42 provided at an end portion (in a precise sense, one end portion in the X-direction) of the holder 40 is retained at an inner panel of a vehicle door.

Hereinafter, a detailed configuration of each of the light emitter 20 and the holder 40 according to the first embodiment will be described with reference to FIGS. 2 to 5 as already described above and FIGS. 6 to 11.

(Light Emitter 20)

Figure 6:
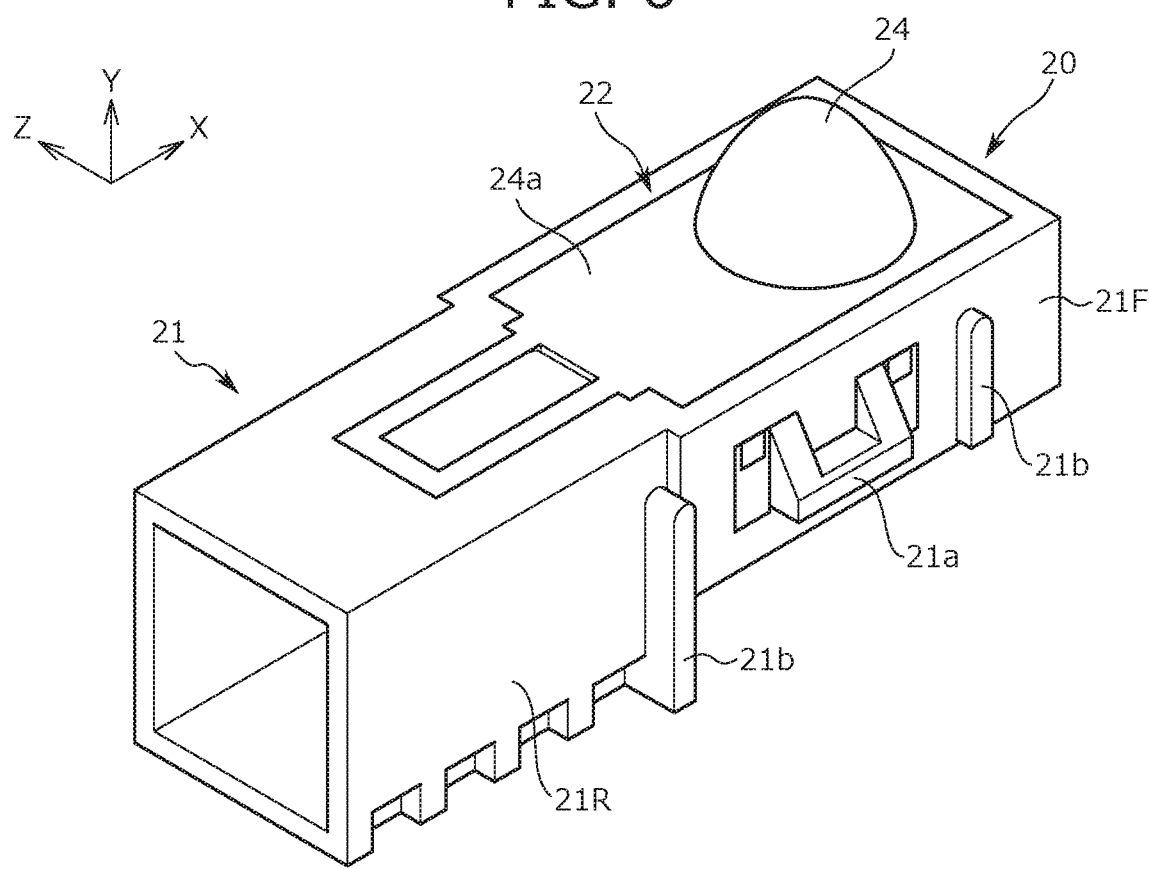
FIG. 6 is a perspective view of a light emitter diagonally from the lateral side.

The configuration of the light emitter 20 will be described. The light emitter 20 has an outer shape illustrated in FIG. 6. Specifically, the light emitter 20 has a substantially rectangular parallelepiped outer shape, and has a base portion 21 and a light emitter body 22 as illustrated in FIG. 6. The base portion 21 is a resin component, and the light emitter body 22 is attached to the base portion 21 as illustrated in FIG. 6. Moreover, the base portion 21 is assembled with the holder 40 (in a precise sense, the holder body 41) as illustrated in FIGS. 2 to 5.

Figure 7:
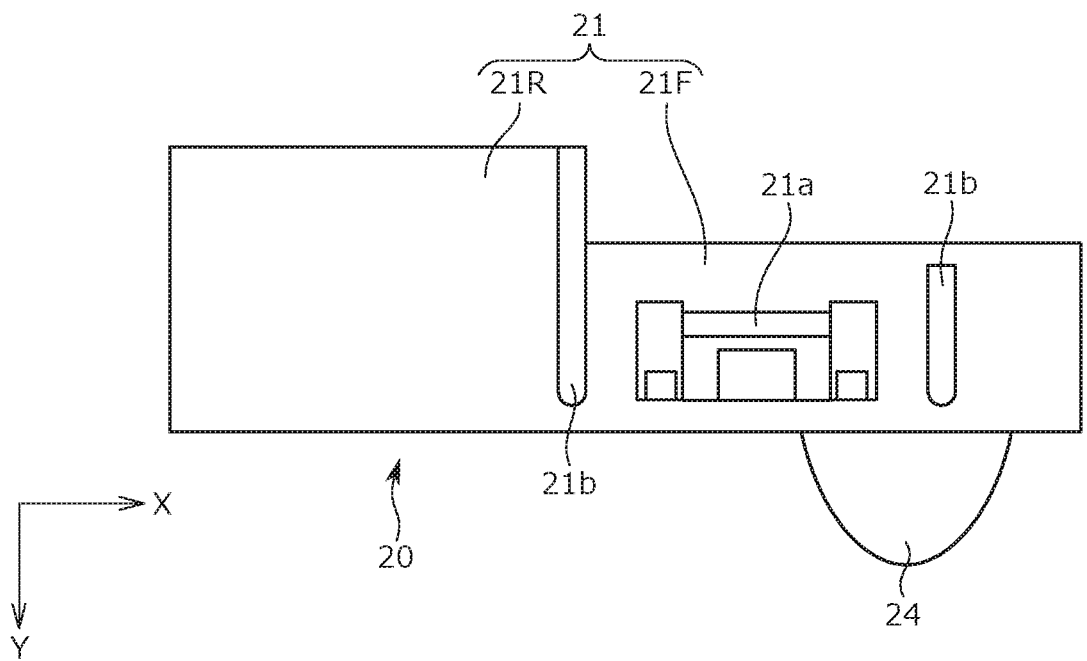
FIG. 7 is a view of the light emitter from the lower side.

The base portion 21 will be described in detail. As illustrated in FIGS. 6 and 7, the base portion 21 has such a structure that two rectangular parallelepiped portions with different heights (different lengths in the Y-direction) are continuous to each other in the X-direction. Hereinafter, a lower portion of the base portion 21 will be referred to as a "lower-height portion 21F," and a higher portion of the base portion 21 will be referred to as a "higher-height portion 21R."

Figure 3:
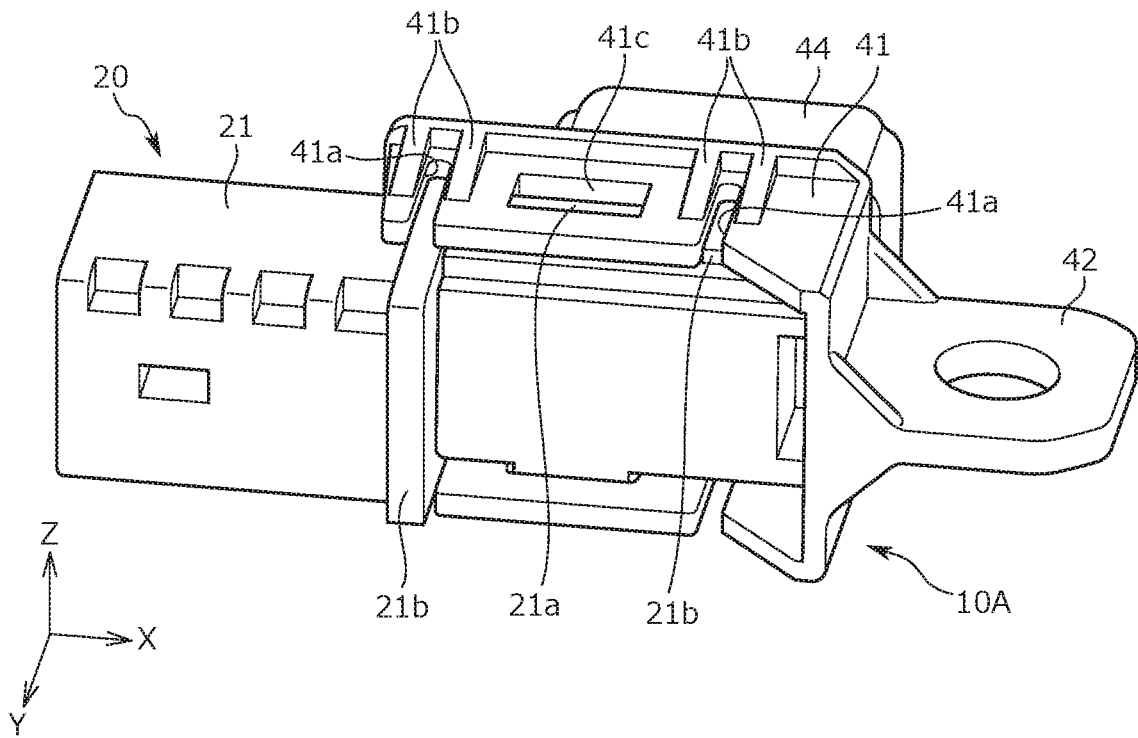
FIG. 3 is a perspective view of the lighting device diagonally from a lower side.

As illustrated in FIGS. 2 and 3, the lower-height portion 21F is housed in the holder body 41 with the light emitter 20 being assembled with the holder 40. More specifically, linking protrusions 21a for snap-fit is formed on side surfaces of the lower-height portion 21F. When the light emitter 20 is assembled with the holder 40, the lower-height portion 21F is housed in a housing space provided in the holder body 41 while the linking protrusions 21a each engage with linking holes 41c formed at the holder body 41. With this configuration, the lower-height portion 21F of the base portion 21 is linked to the holder body 41 by a snap-fit technique. As a result, the light emitter 20 is assembled with the holder body 41.

The higher-height portion 21R is in a rectangular tubular shape. Moreover, as illustrated in FIGS. 2 and 3, the higher-height portion 21R protrudes outward of the holder body 41 without being housed in the holder body 41 in a state in which the light emitter 20 is assembled with the holder 40. Further, the higher-height portion 21R is assembled with a not-shown power source connector, and specifically, the power source connector enters the rectangular tubular higher-height portion 21R.

Further to the technique of assembling the light emitter 20 with the holder 40, the snap-fit linking technique using the linking protrusions 21a and the linking holes 41c is employed, and recessed-raised fitting is further utilized. Specifically, as illustrated in FIGS. 6 and 7, raised protrusions 21b are provided at the surfaces of the base portion 21 provided with the linking protrusions 21a. The raised protrusions 21b are provided on both sides of each linking protrusion 21a in the X-direction, and extend elongated to some extent along the Y-direction. Moreover, as illustrated in FIG. 3, slits 41a are formed at side wall portions of the holder body 41 provided with the linking holes 41c. The slits 41a are formed on both sides of each linking hole 41c in the X-direction, and are formed elongated to some extent along the Y-direction.

When the light emitter 20 is assembled with the holder 40, the linking protrusions 21a each engage with the linking holes 41c, and each raised protrusion 21b is fitted in a corresponding one of the slits 41*a*. With this configuration, the light emitter 20 is more firmly assembled with the holder body 41.

Figure 4:
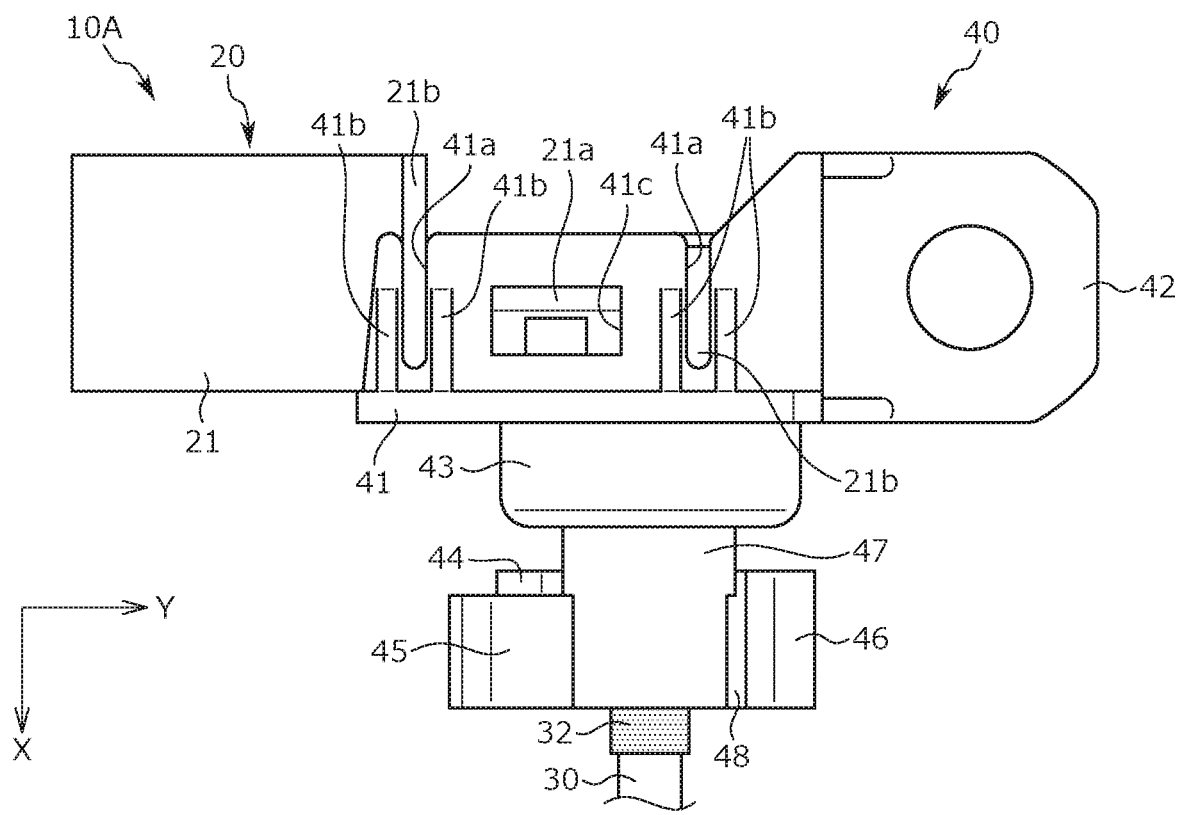
FIG. 4 is a view of the lighting device from the lower side.

Note that reinforcement ribs 41*b* are, as illustrated in FIGS. 3 and 4, provided at the side wall portions of the holder body 41 provided with the slits 41*a*. The ribs 41*b* are, one by one, provided to stand on both sides of each slit 41*a* in the X-direction.

Figure 8:
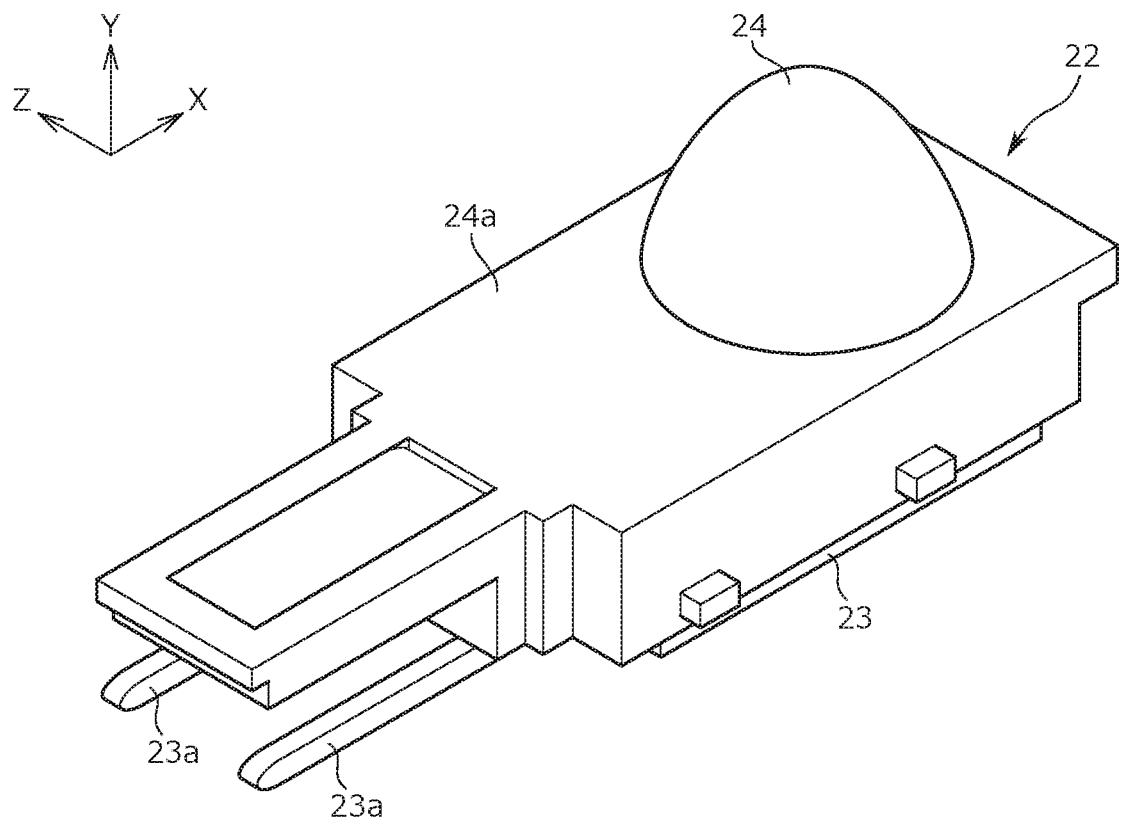
FIG. 8 is a perspective view of a light emitter body diagonally from the lateral side.

The light emitter body 22 forms a main optical portion of the light emitter 20, and has an LED substrate 23 and a light collecting lens 24 as illustrated in FIG. 8. The LED substrate 23 corresponds to the light source, and has a not-shown LED. The LED substrate 23 is configured to cause, in response to a power supply, the LED to emit light. Note that as illustrated in FIG. 8, power receiving terminals 23*a* are provided at the LED substrate 23. The terminals 23*a* are positioned in the higher-height portion 21R of the base portion 21 with the light emitter body 22 being attached to the base portion 21. Thus, when the higher-height portion 21R is assembled with the power source connector, the terminals 23*a* are connected to the power source connector in the higher-height portion 21R.

The light collecting lens 24 is stacked on the LED substrate 23 to collect the light irradiated from the LED. The light collecting lens 24 is in such a shape that the light collecting lens 24 protrudes in a mountain shape in the Y-direction from a flat plate-shaped base portion 24*a* and is narrowed toward a top portion of the light collecting lens 24. Note that the light collecting lens 24 is molded integrally with the base portion 24*a*. As long as materials of the light collecting lens 24 and the base portion 24*a* exhibit light collection properties, these materials are not specifically limited.

As illustrated in FIG. 6, the light emitter body 22 is attached to the base portion 21. Specifically, the light emitter body 22 is fitted in a recess formed at an end surface of the base portion 21 in the Y-direction. Note that in a state in which the light emitter body 22 is assembled with the base portion 21, the top portion of the light collecting lens 24 faces outward (a side opposite to the position of the base portion 21) in the Y-direction as illustrated in FIGS. 6 and 7.

(Holder 40)

The configuration of the holder 40 will be described. The holder 40 is a resin molded article, and forms an outer appearance illustrated in FIG. 9 in a disengagement state in which the optical fiber 30 is not fixed. Moreover, as illustrated in this figure, the holder 40 has the holder body 41, the fixing portion 42, a raised wall 43 as a wall, and two sandwiching portions 44, 45. Note that the above-described portions (specifically, the holder body 41, the fixing portion 42, the raised wall 43, and two sandwiching portions 44, 45) of the holder 40 are in an integrated state. In other words, these portions are molded from resin as a single component. Note that the present invention is not limited to above, and the portions of the holder 40 may be formed as separate components, and may be assembled together to form the single holder 40.

The holder body 41 is a portion to which the light emitter 20 (in a precise sense, the lower-height portion 21F of the base portion 21) is to be attached. Specifically, the holder body 41 includes a substantially rectangular bottom wall portion and side wall portions standing on the bottom wall portion. The side wall portions forming the holder body 41 are formed along two long sides and one short side of four sides corresponding to an outer edge of the bottom wall portion. Note that the slits 41*a* and the linking holes 41*c* as described above are formed at the side wall portions, and the ribs 41*b* are formed on both sides of each slit 41*a*.

The base portion 21 is housed in a space (a housing space) surrounded by the bottom wall portion and the side wall portions. Note that as illustrated in FIGS. 2 and 3, one end (one end in the X-direction) of the housing space is an opening end without a side wall. Thus, the light emitter 20 is attached to the holder body 41 with part (specifically, the higher-height portion 21R) of the base portion 21 protruding outward of the housing space through the above-described opening end.

Figure 9:
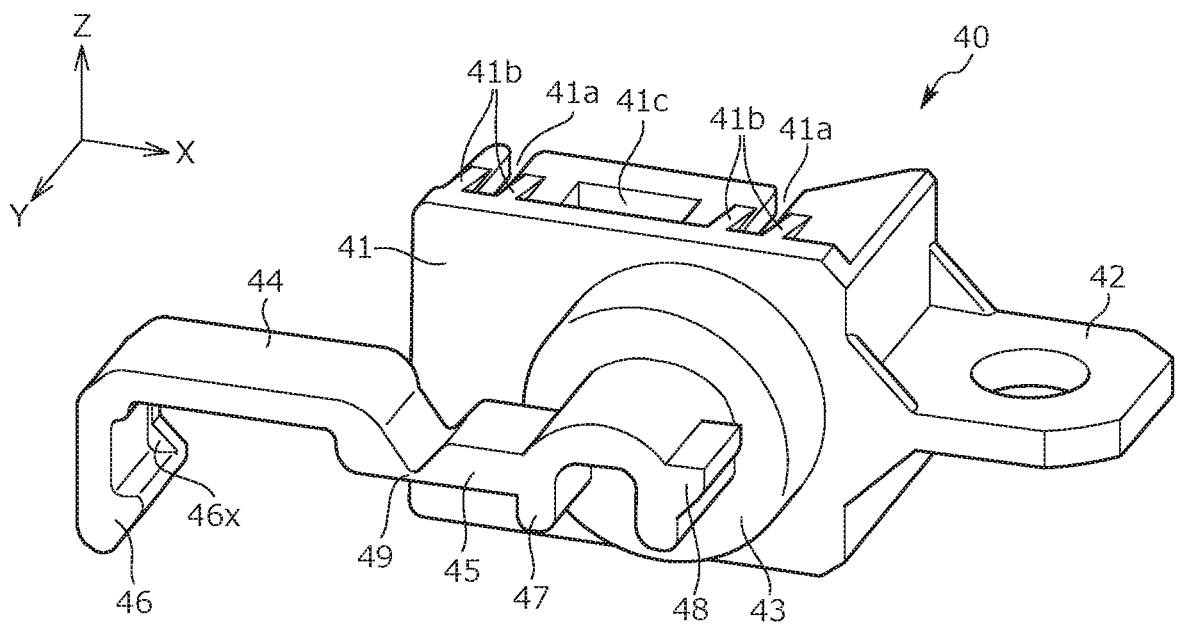
FIG. 9 is a view of a holder in a disengagement state.
Figure 10:
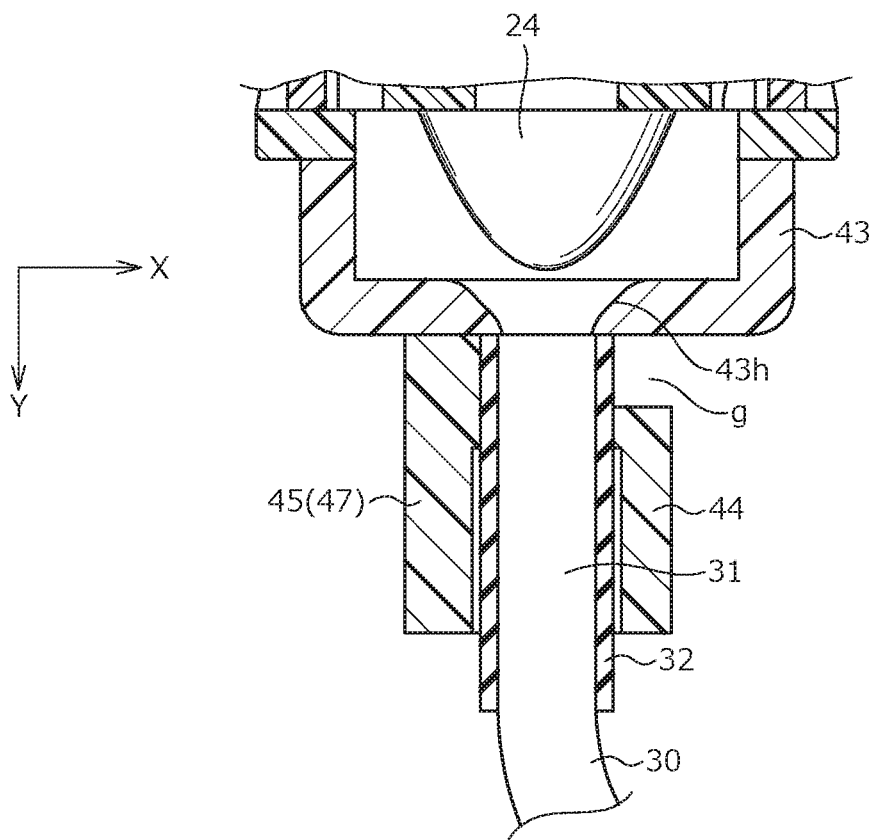
FIG. 10 is a view in the state of holding a light guide body, FIG. 10 illustrating an A-A section of FIG. 5.

Moreover, the light emitter 20 is attached to the holder body 41 in a posture in which the top portion of the light collecting lens 24 faces the bottom wall portion of the holder body 41. More specifically, a portion of the bottom wall portion forms the raised wall 43 in a circular cylindrical shape as illustrated in FIGS. 2 and 9. As illustrated in FIG. 10, the top portion of the light collecting lens 24 enters the raised wall 43 with the light emitter 20 being attached to the holder body 41.

Moreover, as illustrated in FIG. 10, an outermost portion (on a side opposite to the position of the light emitter 20) of the raised wall 43 in the Y-direction is provided with an opening 43*h* in the form of a through-hole. In a state in which the light emitter 20 is attached to the holder body 41, the top portion of the light collecting lens 24 faces the opening 43*h*. Thus, the light emitted from the light collecting lens 24 passes through the opening 43*h*.

Note that the opening 43*h* is a tapered circular hole as illustrated in FIG. 10, and the diameter of the opening 43*h* is narrowed with a distance from the light collecting lens 24. Note that the opening 43*h* is not limited to the circular hole, and may be a semicircular hole or a rectangular hole. The shape of the opening 43*h* is changed as described above so that the amount of light passing through the opening 43*h* can be adjusted. That is, the amount of light reaching the optical fiber 30 can be adjusted. Thus, multiple holders 40 with openings 43*h* in different shapes are prepared so that the amount of light emitted from the optical fiber 30 can be adjusted while the LED having the same light emission intensity is used.

The fixing portion 42 is a portion formed for fixing the holder 40 to a predetermined fixing position (specifically, the inner panel of the door). The fixing portion 42 protrudes in a tongue shape along the X-direction from an end portion of the holder body 41 in the X-direction. Moreover, as illustrated in FIGS. 4 and 9, a circular hole as a bolt insertion hole is formed at a center portion of the fixing portion 42. A bolt inserted into the bolt insertion hole is screwed into a not-shown hole provided at the inner panel of the door, and in this manner, the holder 40 is fixed to the predetermined position of the inner panel.

Two sandwiching portions 44, 45 are portions configured to hold, at the holder 40, the terminal end portion of the optical fiber 30, i.e., the holding target portion 31. Specifically, as illustrated in FIGS. 2 and 5, two sandwiching portions 44, 45 engage with each other in a state in which the holding target portion 31 is sandwiched in the Z-direction. The holding target portion 31 of the optical fiber 30 is sandwiched between two sandwiching portions 44 in the above-described engagement state, and in this manner, is held by the holder 40.

Hereinafter, details of two sandwiching portions 44, 45 will be described. As illustrated in FIGS. 2 and 9, two sandwiching portions 44, 45 are provided at a position (a position on the opposite side of the raised wall 43 from the light emitter 20) on a near side of the raised wall 43 in the Y-direction. Moreover, one sandwiching portion 44 and the other sandwiching portion 45 are coupled with a hinge. Thus, one sandwiching portion 44 is freely rotatable relative to the other sandwiching portion 45. More specifically, one sandwiching portion 44 rotates about a rotary shaft (in a precise sense, a coupling portion 49 between the sandwiching portions 44, 45) along the Y-direction so that the sandwiching portion 44 can move between a disengagement position illustrated in FIG. 9 and a holding position illustrated in FIGS. 2 and 5.

Note that the rotary shaft upon rotation of one sandwiching portion 44, i.e., the coupling portion 49 between the sandwiching portions 44, 45, is positioned opposite to the fixing portion 42 in the X-direction as illustrated in FIGS. 2 and 9. In other words, the fixing portion 42 is provided opposite to the position of the above-described rotary shaft in the X-direction. With such a position relationship, contact between the above-described rotary shaft and the fixing portion 42 can be properly reduced.

Moreover, one sandwiching portion 44 is bent in an L-shape, and an engagement claw 46 is provided at a tip end portion of a short side portion of the L-shape. The engagement claw 46 corresponds to an engagement portion, and has a certain degree of width in the Y-direction. The other sandwiching portion 45 includes, at an end portion in the X-direction (an end portion opposite to the coupling portion 49), a protruding portion 48 to be engaged with the engagement claw 46. The protruding portion 48 corresponds to an engagement target portion, and as in the engagement claw 46, has a certain degree of width in the Y-direction.

When one sandwiching portion 44 rotates relative to the other sandwiching portion 45 to reach the holding position illustrated in FIG. 5, the engagement claw 46 engages with the protruding portion 48. In this manner, two sandwiching portions 44, 45 engage with each other. In this state, when the holding target portion 31 of the optical fiber 30 is arranged between the sandwiching portions 44, 45, the holding target portion 31 is sandwiched between two sandwiching portions 44, 45 in the Z-direction, and is held between the sandwiching portions 44, 45.

Note that as illustrated in FIGS. 2 and 5, two sandwiching portions 44, 45 engage with each other at positions adjacent to the holding target portion 31 in the X-direction, and more precisely, positions adjacent to the holding target portion 31 on the opposite side of the holding target portion 31 from the coupling portion 49 between the sandwiching portions 44, 45. With the above-described configuration of engaging two sandwiching portions 44, 45 at the side of the optical fiber 30, each sandwiching portion 44, 45 has a more compact structure.

More specifically, the above-described configuration can reduce, regarding the dimensions (specifically, the length in the Y-direction) of each sandwiching portion 44, 45, a length necessary for sandwiching the optical fiber 30 as much as possible. As a result, each sandwiching portion 44, 45 is more compact, leading to the more-downsized holder 40.

Note that two sandwiching portions 44, 45 are coupled together with the hinge as described above. With this configuration, handling of the sandwiching portions 44, 45 (specifically, engagement between the sandwiching portions 44, 45) is more facilitated as compared to a configuration in which the sandwiching portions 44, 45 are separated from each other. Note that the present invention is not limited to above. Two sandwiching portions 44, 45 are not necessarily coupled together, but may be separated from each other.

Further, two sandwiching portions 44, 45 employ a structure allowing favorable holding of the holding target portion 31 of the optical fiber 30. Hereinafter, the structure of each sandwiching portion 44, 45 will be described in detail.

Figure 11:
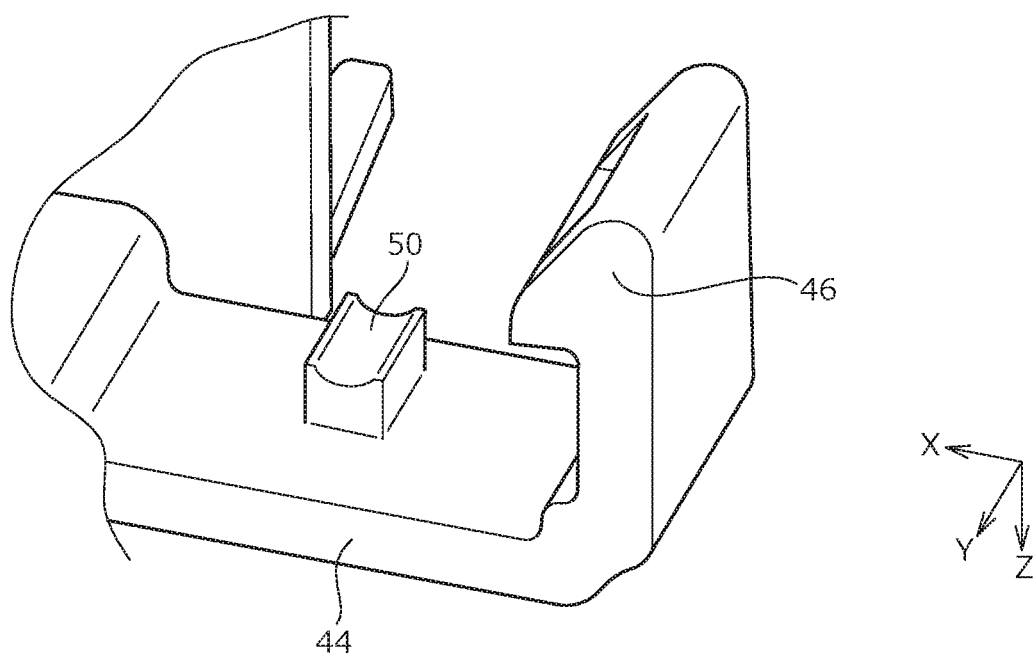
FIG. 11 is a view of a raised portion provided at one sandwiching portion.

As illustrated in FIG. 11, one sandwiching portion 44 (the L-shaped sandwiching portion 44) has a raised portion 50 formed on a surface facing the holding target portion 31. The raised portion 50 includes a protrusion in a substantially rectangular parallelepiped shape. The raised portion 50 contacts and presses the holding target portion 31 with two sandwiching portions 44, 45 sandwiching the holding target portion 31. That is, while two sandwiching portions 44, 45 sandwich the holding target portion 31, the holding target portion 31 is pressed by the raised portion 50. With this configuration, a situation where the holding target portion 31 sandwiched between two sandwiching portions 44, 45 is detached can be effectively reduced.

Note that a top surface of the raised portion 50 is preferably curved in an arc shape as illustrated in FIG. 11 to prevent damage of the holding target portion 31 due to excessive stress upon pressing of the holding target portion 31.

The engagement claw 46 formed at one sandwiching portion 44 will be described. As illustrated in FIG. 9, the shape of one end portion (an end portion closer to the holder body 41) of the engagement claw 46 in the Y-direction is different from those of other portions. More specifically, one end portion of the engagement claw 46 in the Y-direction expands in the Z-direction as compared to other portions. Such an expansion portion is a locking portion 46x formed in a substantially triangular shape.

One end portion of the engagement claw 46 provided with the locking portion 46x in the Y-direction is unable to engage with the protruding portion 48 formed at the other sandwiching portion 45. Thus, the engagement claw 46 engages with the protruding portion 48 at other portions than one end portion.

In a state in which other portions of the engagement claw 46 than one end portion engage with the protruding portion 48, the locking portion 46x formed at one end portion contacts the protruding portion 48. The locking portion 46x contacts the protruding portion 48 as described above, and accordingly, locks the protruding portion 48 in the Y-direction. Specifically, position shift of the protruding portion 48 with respect to the engagement claw 46 in the Y-direction (in other words, movement of one sandwiching portion 44 with respect to the other sandwiching portion 45 in the direction of separating from the holder body 41 in the Y-direction) is restricted. As a result, the engagement claw 46 engages with the protruding portion 48 at a proper engagement portion. That is, a situation where the engagement claw 46 engages with the protruding portion 48 at a portion shifted from an intended engagement portion is properly reduced by the locking portion 46x.

The structure of the other sandwiching portion 45 will be described. As illustrated in FIGS. 5 and 9, a substantially U-shaped portion is provided at a middle position (a middle position in the X-direction) of the sandwiching portion 45. Such a substantially U-shaped portion corresponds to a position determination portion 47 for determining the position of the holding target portion 31 of the optical fiber 30 when the holding target portion 31 is held. The position determination portion 47 is formed to extend from an outer surface of the raised wall 43 in the Y-direction.

When the holding target portion 31 is sandwiched between two sandwiching portions 44, 45, the holding target portion 31 is inserted into an inner space (a space surrounded by the U-shaped position determination portion 47) of the position determination portion 47. At this point, an end surface of the holding target portion 31, i.e., a terminal end of the optical fiber 30, contacts the surface of the raised wall 43. In such a state, the position of the holding target portion 31 is determined by the position determination portion 47. That is, the position determination portion 47 determines the position of the holding target portion 31 at a position at which the end surface of the holding target portion 31 contacts the raised wall 43.

When the position of the holding target portion 31 is determined at the above-described position by the position determination portion 47, part of the end surface of the holding target portion 31 contacting the raised wall 43 faces the opening 43h formed at the raised wall 43, as illustrated in FIG. 10. Moreover, the top portion of the light collecting lens 24 is positioned on the opposite side of the opening 43h from the holding target portion 31. Thus, when the position of the holding target portion 31 is determined by the position determination portion 47, the end surface of the holding target portion 31 faces the top portion of the light collecting lens 24 through the opening 43h. In other words, the position determination portion 47 determines the position of the holding target portion 31 at a position at which the end surface of the holding target portion 31 faces the light collecting lens 24 through the opening 43h. With this configuration, the light emitted from the light collecting lens 24 properly directs to the terminal end of the optical fiber 30 through the opening 43h.

Note that as illustrated in FIG. 10, the size (specifically, the outer diameter size) of an end of the opening 43h closer to the holding target portion 31 is slightly smaller than the sectional size (specifically, the outer diameter size) of the optical fiber 30. Thus, the light emitted from the light collecting lens 24 more properly directs to the terminal end of the optical fiber 30. As a result, light transmission in the optical fiber 30 is efficiently performed.

Note that the size (in a precise sense, the size of the end closer to the holding target portion 31) of the opening 43h is not limited to the size illustrated in FIG. 10, and may be a size significantly smaller than the sectional size of the optical fiber 30. With this configuration, the amount of light reaching the optical fiber 30 can be controlled as described above.

After the position of the holding target portion 31 has been determined by the position determination portion 47 as described above, one sandwiching portion 44 rotates relative to the other sandwiching portion 45, and two sandwiching portions 44, 45 engage with each other. That is, two sandwiching portions 44, 45 engage with each other to sandwich the holding target portion 31 such that the end surface of the holding target portion 31 faces the light collecting lens 24 through the opening 43h. With this configuration, the optical fiber 30 is held at the holder 40 in a state in which the light emitted from the light collecting lens 24 can be favorably trapped.

Note that the protruding portion 48 provided at the other sandwiching portion 45 is provided on an outer peripheral surface of the position determination portion 47 as illustrated in FIGS. 2 and 5. More specifically, the protruding portion 48 is formed to protrude in the X-direction from an end portion of the outer periphery of the position determination portion 47 positioned opposite to the coupling portion 49 between two sandwiching portions 44, 45 in the X-direction. Since the protruding portion 48 is provided on the position determination portion 47 as described above, the sandwiching portions 44, 45 can engage with each other with the position of the holding target portion 31 of the optical fiber 30 being determined.

In a state in which two sandwiching portions 44, 45 engage with each other, i.e., a state in which the optical fiber 30 is held at the holder 40, part of the outer periphery of the holding target portion 31 of the optical fiber 30 is surrounded by two sandwiching portions 44, 45 as illustrated in FIGS. 2 and 5. More specifically, the holding target portion 31 is housed in the inner space of the position determination portion 47 with two sandwiching portions 44, 45 engaging with each other. Moreover, in a state in which two sandwiching portions 44, 45 engage with each other, part (a portion corresponding to a long side of the L-shape) of one sandwiching portion 44 contacts an opening end portion of the position determination portion 47. As a result, part of the outer periphery of the holding target portion 31 is surrounded by one sandwiching portion 44 and the position determination portion 47 of the other sandwiching portion 45.

Since part of the outer periphery of the holding target portion 31 is surrounded by two sandwiching portions 44, 45 as described above, the state of holding the holding target portion 31 is stabilized. Further, light leakage from the holding target portion 31 is reduced, and as a result, light transmission in the optical fiber 30 is efficiently performed.

The width (the length in the Y-direction) of one sandwiching portion 44 is shorter than the width (the length in the Y-direction) of the position determination portion 47 of the other sandwiching portion 45. More specifically, one end of one sandwiching portion 44 is at the substantially same position as that of one end (a free end) of the position determination portion 47 in the Y-direction as illustrated in FIG. 2. On the other hand, the other end of one sandwiching portion 44 is somewhat positioned on the near side with respect to the other end (a fixed end) of the position determination portion 47 in the Y-direction as illustrated in this figure. In the above-described configuration, when two sandwiching portions 44, 45 engage with each other, a clearance g is formed between one sandwiching portion 44 and the holder body 41 (in a precise sense, the raised wall 43) as illustrated in FIG. 10.

Of the holding target portion 31 in the position determination portion 47, a portion positioned near the fixed end of the position determination portion 47 in the Y-direction is exposed through the clearance g in a state in which two sandwiching portions 44, 45 engage with each other. Thus, the position of the holding target portion 31 and the state of holding the holding target portion 31 (e.g., whether or not the end surface of the holding target portion 31 reliably contacts the raised wall 43) can be visually checked through the clearance g.

<<Variation of Configuration of Lighting Device>>

Next, a configuration of a lighting device 10B according to a second embodiment will be described as a variation of the configuration of the lighting device. The lighting device 10B described herein is one example of the subject device 10, and corresponds to the lighting device of the present invention.

Figure 12:
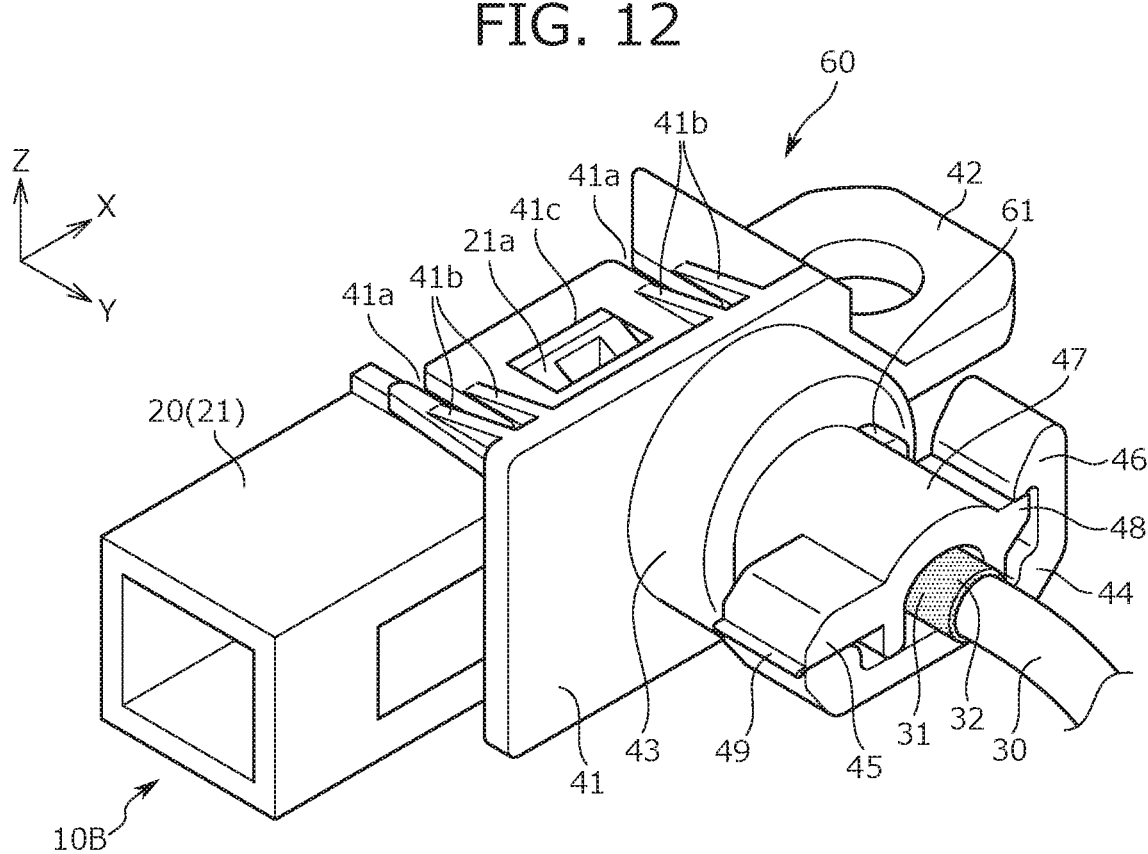
FIG. 12 is a perspective view of a lighting device according to a second embodiment of the present invention diagonally from a lateral side.

The lighting device 10B according to the second embodiment is, in terms of a basic configuration, similar to the lighting device 10A according to the first embodiment. That is, as illustrated in FIG. 12, the lighting device 10B has a light emitter 20, an optical fiber 30, and a holder 60. FIG. 12 is a perspective view of the lighting device 10B according to the second embodiment, and is a drawing corresponding to FIG. 2. Note that in FIG. 12, the same reference numerals as those of the first embodiment are used to represent components with the same functions and structures as those of the first embodiment. Moreover, description of the components with the same reference numerals as those of the first embodiment will not be made below.

Of the lighting device 10B according to the second embodiment, the holder 60 is different from the holder 40 of the lighting device 10A according to the first embodiment. Hereinafter, differences of the holder 60 according to the second embodiment from the holder 40 according to the first embodiment will be mainly described.

Figure 13:
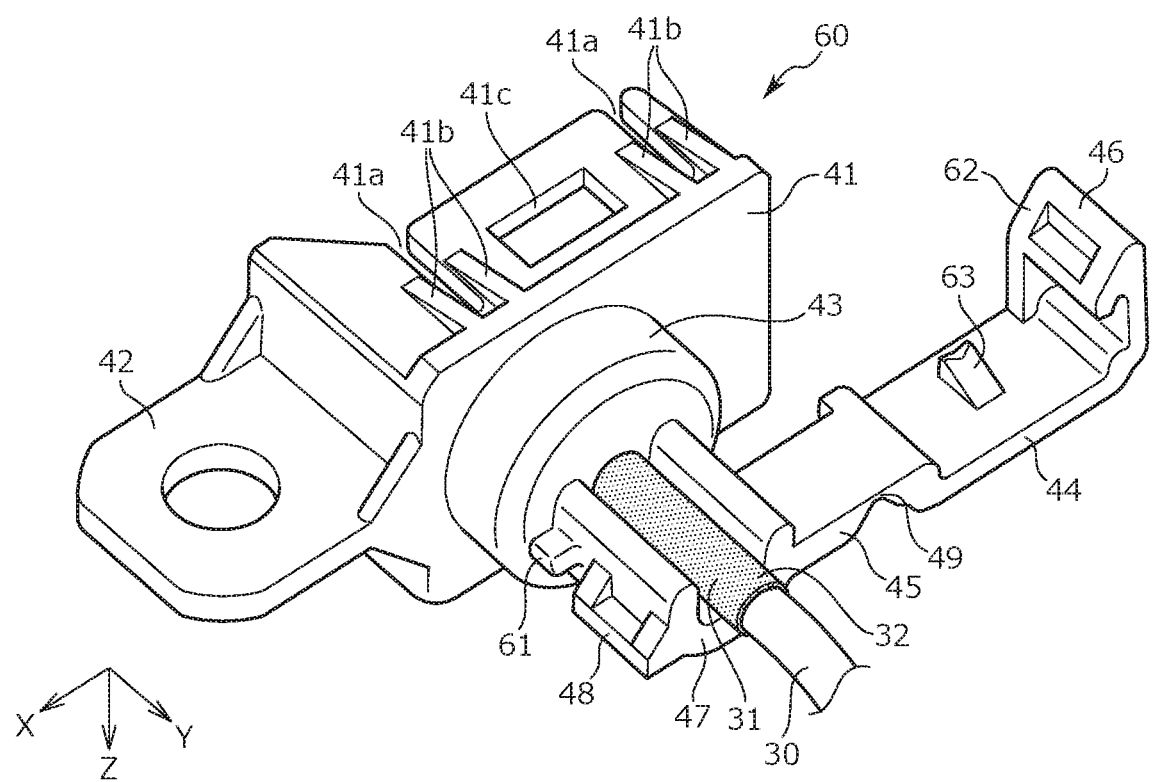
FIG. 13 is a perspective view of a holder according to the second embodiment of the present invention diagonally from the lateral side.

The holder 60 according to the second embodiment is, in terms of a basic configuration, similar to the holder 40 according to the first embodiment. That is, the holder 60 according to the second embodiment has, as illustrated in FIG. 13, a holder body 41, a fixing portion 42, a raised wall 43 as a wall, and two sandwiching portions 44, 45. FIG. 13 is a perspective view of the holder 60 according to the second embodiment. Note that in FIG. 13, the same reference numerals as those of the first embodiment are used to represent portions with the same functions and structures as those of the holder 40 according to the first embodiment. Moreover, description of the portions with the same reference numerals as those of the first embodiment will not be made below.

As illustrated in FIG. 13, the holder 60 according to the second embodiment has a protruding portion 61. The protruding portion 61 is a portion protruding from the holder body 41 toward two sandwiching portions 44, 45 in the Y-direction. Moreover, the protruding portion 61 functions as a reducer, and is configured to reduce shift of an engagement portion between two sandwiching portions 44, 45 toward the position of the holder body 41 in the Y-direction.

The protruding portion 61 will be described in detail. As illustrated in FIG. 12, the protruding portion 61 is provided next to two sandwiching portions 44, 45 in the Y-direction. More specifically, the protruding portion 61 is, as illustrated in FIG. 13, provided at a position next to a protruding portion 48 of the other sandwiching portion 45 in the Y-direction. Note that in the present embodiment, the protruding portion 61 is provided in a space of a corner portion formed between the raised wall 43 and a position determination portion 47.

When one sandwiching portion 44 rotates relative to the other sandwiching portion 45 to reach a position (a holding position) at which an engagement claw 46 engages with the protruding portion 48, the engagement claw 46 is arranged at a position adjacent to the protruding portion 61 in the Y-direction. At such a position, the engagement claw 46 engages with the protruding portion 48. In other words, two sandwiching portions 44, 45 engage with each other at a position on the near side of the protruding portion 61 in the Y-direction (the opposite side of the protruding portion 61 from the position of the holder body 41).

With the protruding portion 61 as described above, shift of the engagement portion between two sandwiching portions 44, 45 toward the position of the holder body 41 in the Y-direction can be reduced. Specifically, when one sandwiching portion 44 rotates to deviate from a regular route and the engagement claw 46 is about to engage with the protruding portion 48 with the engagement claw 46 being somewhat shifted closer to the holder body 41 with respect to an intended engagement portion, the engagement claw 46 comes into contact with the protruding portion 61 right before the above-described point of time. Thus, engagement of the engagement claw 46 with the protruding portion 48 at the shifted engagement position can be reduced. As a result, two sandwiching portions 44, 45 engage with each other at a proper engagement portion, and therefore, the optical fiber 30 can be properly held at the holder 40.

Figure 14:
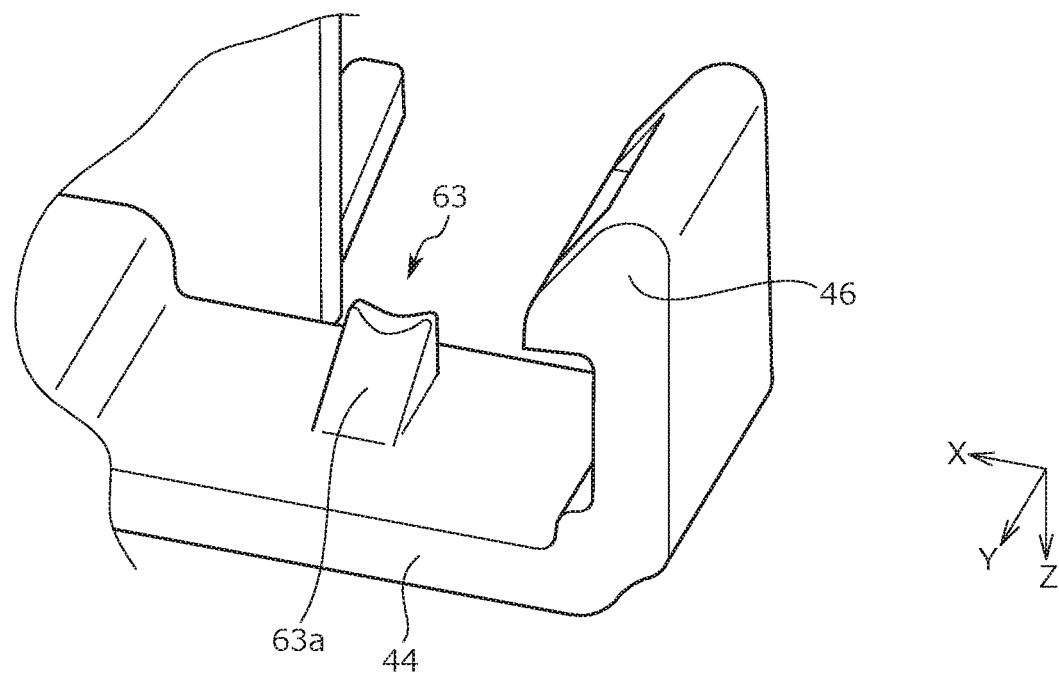
FIG. 14 is a view of a raised portion according to the second embodiment of the present invention.
Figure 15:
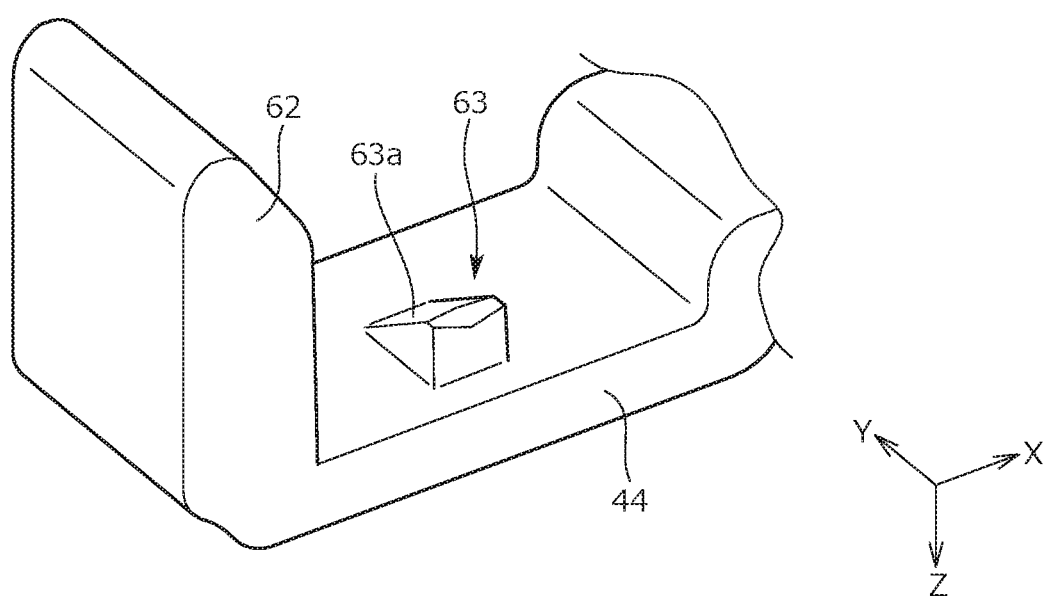
FIG. 15 is a view of the raised portion according to the second embodiment of the present invention from a direction opposite to the direction of viewing the raised portion in FIG. 14.

In the second embodiment, a portion with a shape different from that of the engagement claw 46 is provided at a tip end portion of one sandwiching portion 44 provided with the engagement claw 46. Such a portion is an adjacent portion 62 adjacent to an end portion of the engagement claw 46 closer to the holder body 41 in the Y-direction. As will be seen from comparison between FIGS. 14 and 15, the adjacent portion 62 is not in a shape recessed at a middle position as in the engagement claw 46, but is in a shape with a substantially uniform thickness (in a precise sense, a substantially trapezoidal shape as viewed from the front as illustrated in FIG. 15).

That is, the adjacent portion 62 does not serve as the engagement claw 46, and is unable to engage with the protruding portion 48 formed at the other sandwiching portion 45. With the adjacent portion 62, shift of the engagement portion between two sandwiching portions 44, 45 in the Y-direction can be more effectively reduced. Specifically, when the engagement claw 46 is about to engage with the protruding portion 48 with the engagement claw 46 being somewhat shifted from the intended engagement portion in the direction of separating from the holder body 41, the adjacent portion 62 comes into contact with the protruding portion 48 right before the above-described point of time. However, the adjacent portion 62 is unable to engage with the protruding portion 48 as described above, and therefore, two sandwiching portions 44, 45 cannot engage with each other in this state. With this configuration, a situation where the engagement portion between two sandwiching portions 44, 45 is shifted in the Y-direction is reduced, and as a result, the engagement claw 46 engages with the protruding portion 48 at a proper engagement portion.

Moreover, in the second embodiment, one sandwiching portion 44 (the L-shaped sandwiching portion 44) has, as in the first embodiment, a raised portion 63 formed on a surface facing a holding target portion 31. Note that the raised portion 63 according to the second embodiment is, as illustrated in FIGS. 14 and 15, in a shape different from that of the raised portion according to the first embodiment, and specifically, includes a wedge-shaped protrusion. That is, the raised portion 63 according to the second embodiment includes an inclined surface 63a. The inclined surface 63a is lower with a distance from the holder body 41 in the Y-direction (in other words, the inclined surface 63a approaches a surface of the sandwiching portion 44 facing the holding target portion 31).

In a state in which two sandwiching portions 44, 45 sandwich the holding target portion 31, the wedge-shaped raised portion 63 contacts the holding target portion 31 at the inclined surface 63a. That is, while two sandwiching portions 44, 45 sandwich the holding target portion 31, the holding target portion 31 is pressed by the wedge-shaped raised portion 63. In this state, the inclined surface 63a is inclined in the above-described inclination direction, and therefore, the force of pressing the holding target portion 31 increases toward a terminal end of the holding target portion 31. As a result, a situation where the holding target portion 31 sandwiched between two sandwiching portions 44, 45 is detached can be significantly effectively reduced.

Note that a top portion of the raised portion 63 may be cut out in an arc shape as illustrated in FIGS. 14 and 15 for the purpose of avoiding damage of the holding target portion 31. Note that when the top portion of the raised portion 63 is cut out in the arc shape, the area of contact between the raised portion 63 and the holding target portion 31 is increased. With this configuration, the situation where the holding target portion 31 sandwiched between two sandwiching portions 44, 45 is detached can be much more effectively reduced.

REFERENCE SIGNS LIST

1: vehicle door lining
2: base trim
3: panel trim
4: housing groove
10: subject device (lighting device)
10A: lighting device
10B: lighting device
20: light emitter
21: base portion
21F: lower-height portion
21R: higher-height portion
21a: linking protrusion
21b: raised protrusion
22: light emitter body
23: LED substrate (light source)
23a: terminal
24: light collecting lens
24a: base portion
30: optical fiber (light guide body)
31: holding target portion
32: shrinkable band
40: holder
41: holder body
41a: slit
41b: rib
41c: linking hole
42: fixing portion
43: raised wall (wall)
43h: opening
44: sandwiching portion
45: sandwiching portion
46: engagement claw (engagement portion)
46x: locking portion
47: position determination portion
48: protruding portion (engagement target portion)
49: coupling portion (rotary shaft)
50: raised portion
60: holder
61: protruding portion (reducer)
62: adjacent portion
63: raised portion
63a: inclined surface
g: clearance

The invention claimed is:
1. A lighting device comprising:
a light emitter;
a linearly-extending light guide body; and
a holder configured to hold the light guide body with the light guide body facing the light emitter, wherein
the holder includes two sandwiching portions configured to engage with each other in a state in which a holding target portion of the light guide body held by the holder is sandwiched in a first direction crossing an extending direction of the holding target portion,
the two sandwiching portions engage with each other at positions adjacent to the holding target portion in a second direction crossing both of the extending direction and the first direction, one of the two sandwiching portions is coupled to the other one of the two sandwiching portions with a hinge, and is freely rotatable relative to the other one of the two sandwiching portions,
a rotary shaft, where the one of the two sandwiching portions rotates relative to the other one of the two sandwiching portions, is along the extending direction,
the holder includes a fixing portion formed for fixing the holder to an element other than the holder, and
the fixing portion protrudes in the second direction and is provided on a side opposite to a position of the rotary shaft with respect to the holding target portion in the second direction.

2. The lighting device according to claim 1, wherein
the holder includes a holder body to be assembled with the light emitter, and
the holder body and the two sandwiching portions are integrated together.

3. The lighting device according to claim 1, wherein
in a state in which the holder holds the light guide body, an outer periphery of the holding target portion is surrounded by the two sandwiching portions.

4. The lighting device according to claim 1, wherein
the holder includes a holder body to be assembled with the light emitter,
the light emitter includes a light source and a light collecting lens configured to collect light emitted from the light source,
the holder body includes a wall provided with an opening, and
the two sandwiching portions engage with each other in a state in which the two sandwiching portions sandwich the holding target portion such that an end surface of the holding target portion faces the light collecting lens through the opening.

5. The lighting device according to claim 4, wherein
the one of the two sandwiching portions has a claw-shaped engagement portion to be engaged with an engagement target portion of the other one of the two sandwiching portions,
the other one of the two sandwiching portions has the engagement target portion and a position determination portion configured to determine a position of the holding target portion at a position at which the end surface contacts the wall, and
the engagement target portion is provided on an outer peripheral surface of the position determination portion.

6. The lighting device according to claim 1, wherein
the one of the two sandwiching portions has a raised portion formed on a surface facing the holding target portion, and
in a state in which the two sandwiching portions sandwich the holding target portion, the raised portion contacts and presses the holding target portion.

7. The lighting device according to claim 1, wherein
the one of the two sandwiching portions has a claw-shaped engagement portion to be engaged with an engagement target portion of the other one of the two sandwiching portions, and
at an end portion of the engagement portion in the extending direction, a locking portion configured to contact and lock the engagement target portion with the engagement portion engaging with the engagement target portion is provided.

8. The lighting device according to claim 1, wherein
the holder includes a holder body to be assembled with the light emitter, the two sandwiching portions, and a reducer provided at a position next to the two sandwiching portions in the extending direction and configured to reduce shift of an engagement portion between the two sandwiching portions toward a position of the holder body in the extending direction.

9. The lighting device according to claim 8, wherein
the reducer is a protruding portion protruding from the holder body toward the two sandwiching portions in the extending direction.

10. The lighting device according to claim 8, wherein
one of the two sandwiching portions has a raised portion formed on a surface facing the holding target portion, and in a state in which the two sandwiching portions sandwich the holding target portion, the raised portion contacts the holding target portion.

11. The lighting device according to claim 10, wherein
the raised portion is a wedge-shaped protrusion, and has an inclined surface closer to the surface facing the holding target portion with a distance from the holder body in the extending direction.

12. The lighting device according to claim 10, wherein
a top portion of the raised portion is cut out in an arc shape.

13. A lighting device comprising:
a light emitter;
a linearly-extending light guide body; and
a holder configured to hold the light guide body with the light guide body facing the light emitter, wherein
the holder includes two sandwiching portions configured to engage with each other in a state in which a holding target portion of the light guide body held by the holder is sandwiched in a first direction crossing an extending direction of the holding target portion,
the two sandwiching portions engage with each other at positions adjacent to the holding target portion in a second direction crossing both of the extending direction and the first direction,
the light emitter includes a light source and a light collecting lens configured to collect light emitted from the light source,
the holder includes a wall provided with an opening,
the opening is a tapered circular hole having a diameter that becomes narrower as a distance from the light collecting lens increases, and an end surface of the holding target portion faces the light collecting lens through the opening.

14. The lighting device according to claim 13, wherein
one of the two sandwiching portions is coupled to the other one of the two sandwiching portions with a hinge, and is freely rotatable relative to the other one of the two sandwiching portions.

15. The lighting device according to claim 14, wherein
a rotary shaft, where the one of the two sandwiching portions rotates relative to the other one of the two sandwiching portions, is along the extending direction.

16. The lighting device according to claim 1, wherein
one of the two sandwiching portions has a position determination portion configured to determine a position of the holding target portion, and a gap is formed between the position determination portion and the holding target portion in the second direction.

17. The lighting device according to claim 1 wherein
the holder includes a holder body to be assembled with the light emitter,
the holder body and the two sandwiching portions are integrated together, and
in a state in which the two sandwiching portions engage with each other, a clearance is formed between the other one of the two sandwiching portions and the holder body and a portion of the holding target portion is exposed through the clearance.

18. A vehicle door lining comprising the lighting device according to claim 1.

19. The lighting device according to claim 13, wherein
one of the two sandwiching portions has a position determination portion configured to determine a position of the holding target portion, and a gap is formed between the position determination portion and the holding target portion in the second direction.

20. The lighting device according to claim 13, wherein
the holder includes a holder body to be assembled with the light emitter,
the holder body and the two sandwiching portions are integrated together, and
in a state in which the two sandwiching portions engage with each other, a clearance is formed between the other one of the two sandwiching portions and the holder body and a portion of the holding target portion is exposed through the clearance.

* * * * *